(12) United States Patent
Lasko

(10) Patent No.: US 8,653,425 B2
(45) Date of Patent: Feb. 18, 2014

(54) ROTARY APPLICATOR

(76) Inventor: Bernard Lasko, Spartanburg, SC (US)

( * ) Notice: Subject to any disclaimer, the term of this patent is extended or adjusted under 35 U.S.C. 154(b) by 0 days.

(21) Appl. No.: 13/179,913

(22) Filed: Jul. 11, 2011

(65) Prior Publication Data

US 2013/0017329 A1     Jan. 17, 2013

(51) Int. Cl.
*H05B 6/10* (2006.01)
*H05B 6/22* (2006.01)

(52) U.S. Cl.
USPC .............................. 219/634; 219/635; 219/652

(58) Field of Classification Search
USPC ......... 219/634, 632, 637, 672, 673, 619, 216, 219/635, 652, 426; 366/146, 316; 118/623, 118/248, 224, 258, 244, 723 MW, 301; 373/138, 151, 152, 157; 427/591, 598, 427/422, 427.4; 399/67; 222/146.1, 146.5
See application file for complete search history.

(56) References Cited

U.S. PATENT DOCUMENTS

| | | | | |
|---|---|---|---|---|
| 4,773,352 A | * | 9/1988 | Steiner ........................ | 118/411 |
| 6,163,562 A | * | 12/2000 | Franci .......................... | 373/151 |
| 7,304,123 B2 | * | 12/2007 | Thompson et al. ........... | 528/491 |
| 2007/0189794 A1 | * | 8/2007 | Umezawa et al. ............. | 399/67 |
| 2007/0193511 A1 | * | 8/2007 | Sasamoto et al. ............ | 118/666 |
| 2008/0190365 A1 | * | 8/2008 | Lasko .......................... | 118/623 |
| 2008/0191391 A1 | * | 8/2008 | Lasko .......................... | 264/431 |
| 2011/0140310 A1 | * | 6/2011 | Lin ............................. | 264/403 |

* cited by examiner

*Primary Examiner* — Quang Van
*Assistant Examiner* — Hung D Nguyen

(57) ABSTRACT

Induction heating of a pattern perforated rotating cylinder susceptor is utilized to melt and apply thermoplastic materials to a substrate.

6 Claims, 7 Drawing Sheets

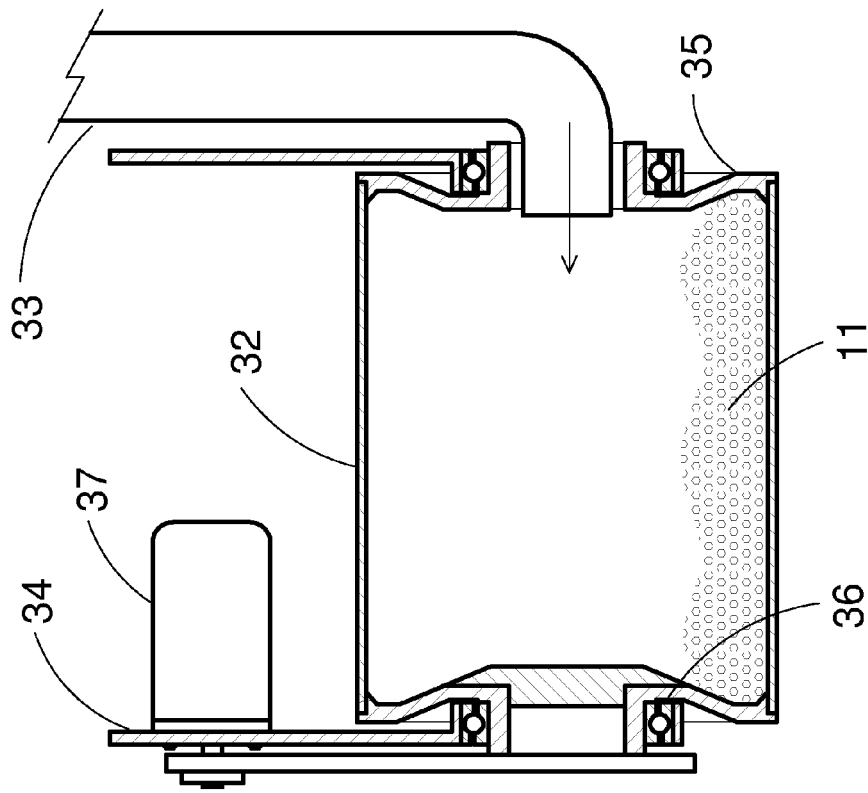
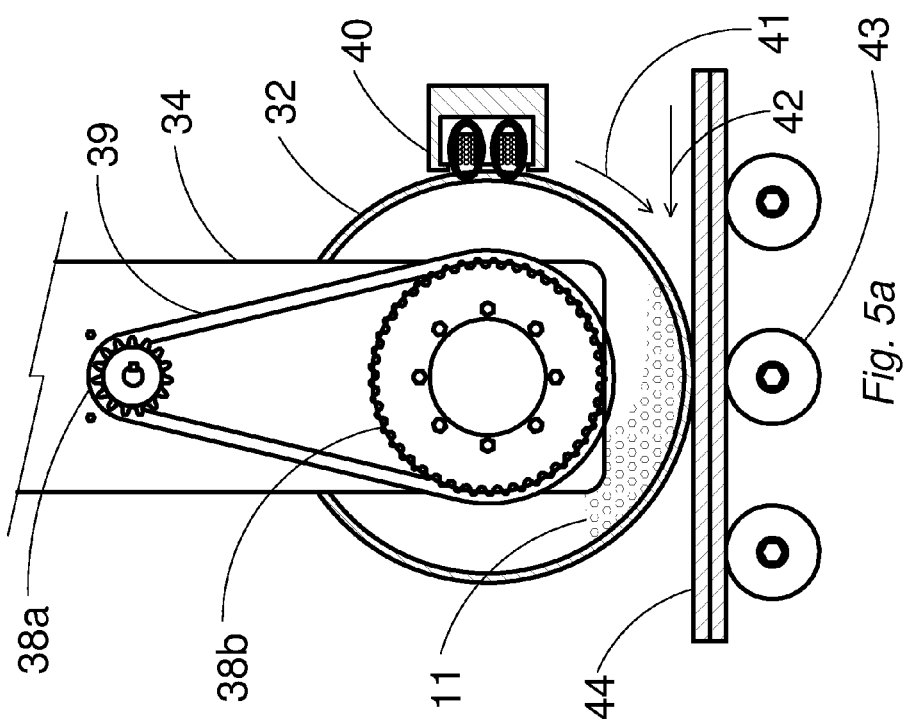

ROTARY APPLICATOR

FIELD OF THE INVENTION

Pellitized thermoplastic materials are melted and continuously pattern applied to a moving substrate.

BACKGROUND OF THE INVENTION

Slot coaters and roll coaters are used to apply hot melt adhesives for laminating construction sheet materials, container labels, decorative coverings, and apparel. These and like items serving the industry batch melt materials, deliver to the application point by pressurized heated hoses, apply by heated rolls in a heated bath or manifolds of heated valves and nozzles. The rolls and bath of some roll coaters are heated and maintained at temperature by heated oil. They all experience start up delay required to heat for melting, delivery, and application apparatus. Materials are exposed to a long path and long time at temperature before application. This method necessarily contributes to energy inefficiency and material degradation.

The invention utilizes a perforated sheet steel cylinder susceptor heated by a bar inductor coil to both melt and apply pelletized hot melt adhesive at the application point. Other particle forms of hot melt adhesive such as prills, slats, and chiclets can be applied with the apparatus of the invention. The cylinder susceptor can be fabricated from custom or commercial perforated sheet steel. It can also have an intricate custom pattern etched through a sheet steel cylinder. Bar coil fabrication is well known in the induction heating industry for welded tube seam anneal, heating paper calendaring rolls, and the drying of metal sheet coatings. The length and diameter of the cylinder are chosen to accommodate the size range of substrate to be coated. The amount of high frequency power and rotation speed of the cylinder is adjusted to accommodate the volume of material applied in the process. The process temperature can be controlled by thermocouple wireless transmission or infrared view of the application cylinder.

The apparatus of the invention melts materials within a few seconds at the application point and applies in a pattern or full surface coating. The application cylinder can apply pressure to successive lamination layers. Energy efficiency is superior. Start up time is within a minute. The minor number of components of the invention yields an apparatus of lesser cost.

BRIEF DESCRIPTION OF THE DRAWINGS

FIG. 5 is a partial cross section of a horizontal embodiment of the invention.

FIG. 5A is a side view in partial cross section of FIG. 5.

DETAILED DESCRIPTION OF THE INVENTION

Figure 1:
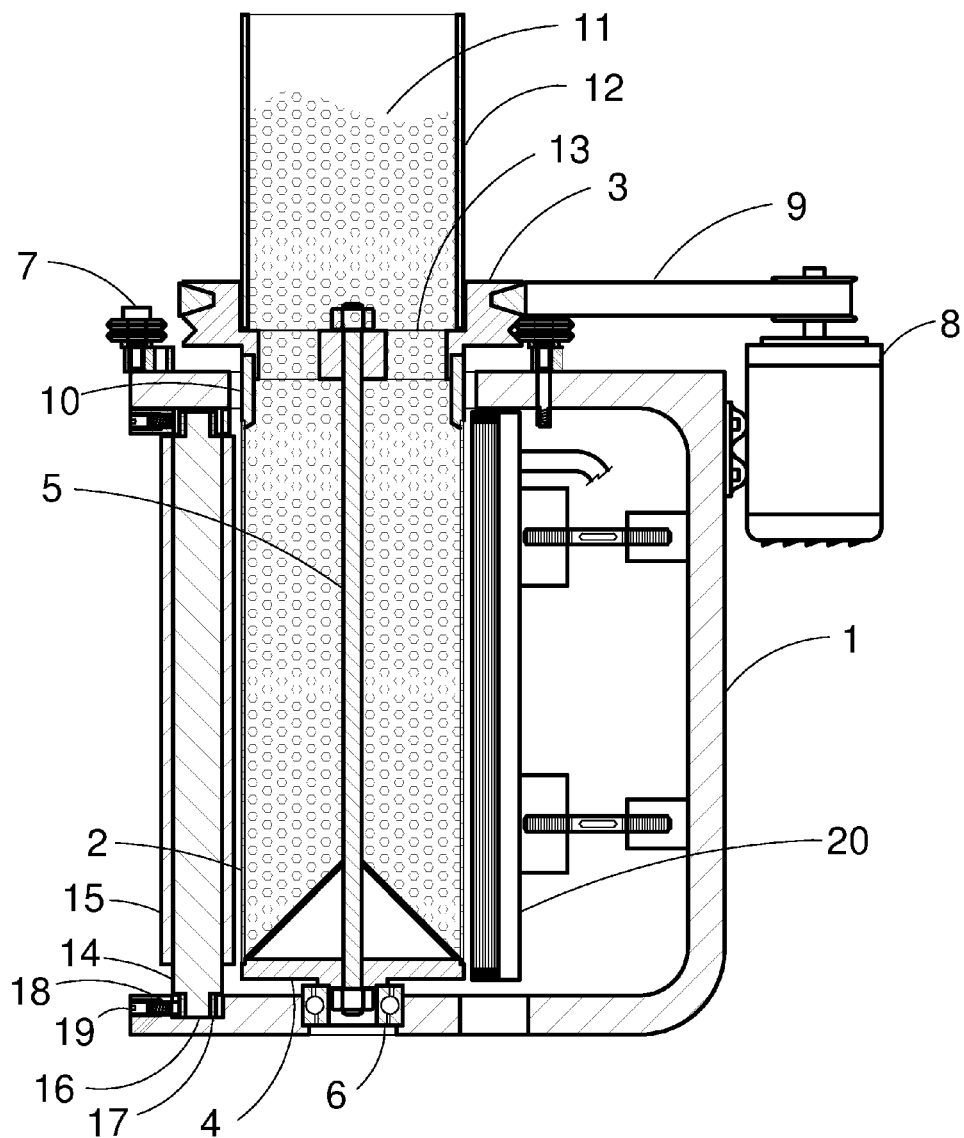
FIG. 1 is a partial cross section of a vertical apparatus.

The major components of a vertical applicator are shown in FIG. 1. Frame 1 holds perforated cylinder susceptor 2 in compression between pulley 3 and base 4 with draw bar 5. The assembly of components 2 through 5 is supported in frame 1 by bottom bearing 6 and cam followers 7. The aforementioned assembly is rotated by variable speed motor 8 via belt 9. Base 4 and thermal isolating collar 10 are constructed of a material, such as Teflon.

Pellitized thermoplastic material 11 is gravity fed through cylinder 12, held in place by pulley 3. Holes 13 in pulley 3 allow material 11 full contact with the interior surface of susceptor 2. Only one layer of pellet material 11 reaches the plastic state, melts through the perforations, and obtains the set application temperature of the cylinder susceptor 2.

In this embodiment of the invention, steel pressure roll 14 with Teflon cover 15 is positioned by guide pockets 16 and sleeve bearings 17 to apply variable pressure to the roll with springs 18 and adjusting screws 19 at each end.

Figure 3:
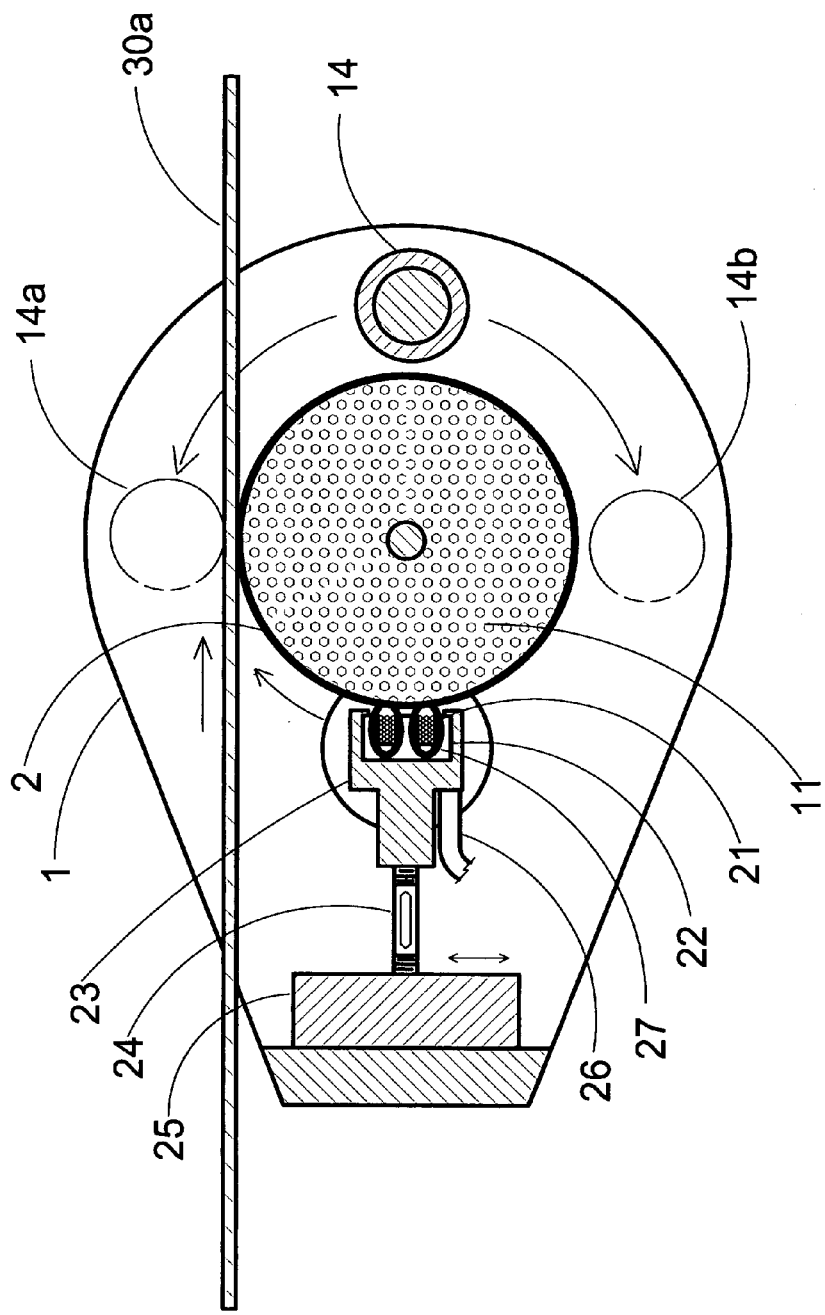
FIG. 3 is a top view in partial cross section of the FIG. 1 apparatus.

Bar inductor coil 20 is constructed of multi-turns of Litz wire 21 wrapped within stacked "E" cores of ferrite material 22 of FIG. 3. Coil 20 is held in adjustable placement by "T" slot holder 23, two counter threaded pins 24, and positioning block 25. Power is applied by flexible cable 26 from a high frequency power supply operating at preferably 100 KHz. Cylinder susceptor 2 is preferably constructed of 20 ga. steel to respond quickly to the induced current and retain little heat to yield to the pelletized material before the next rotation. A typical perforation pattern is 1/16" staggered on 1/8" centers [larger or smaller for greater or lesser viscosity at application temperature]. The magnetic field 27 formed by inductor coil 20 intercepts cylinder susceptor 2 to induce a current traversing the length of the cylinder reflecting the loop shape of inductor coil 20.

Figure 2:
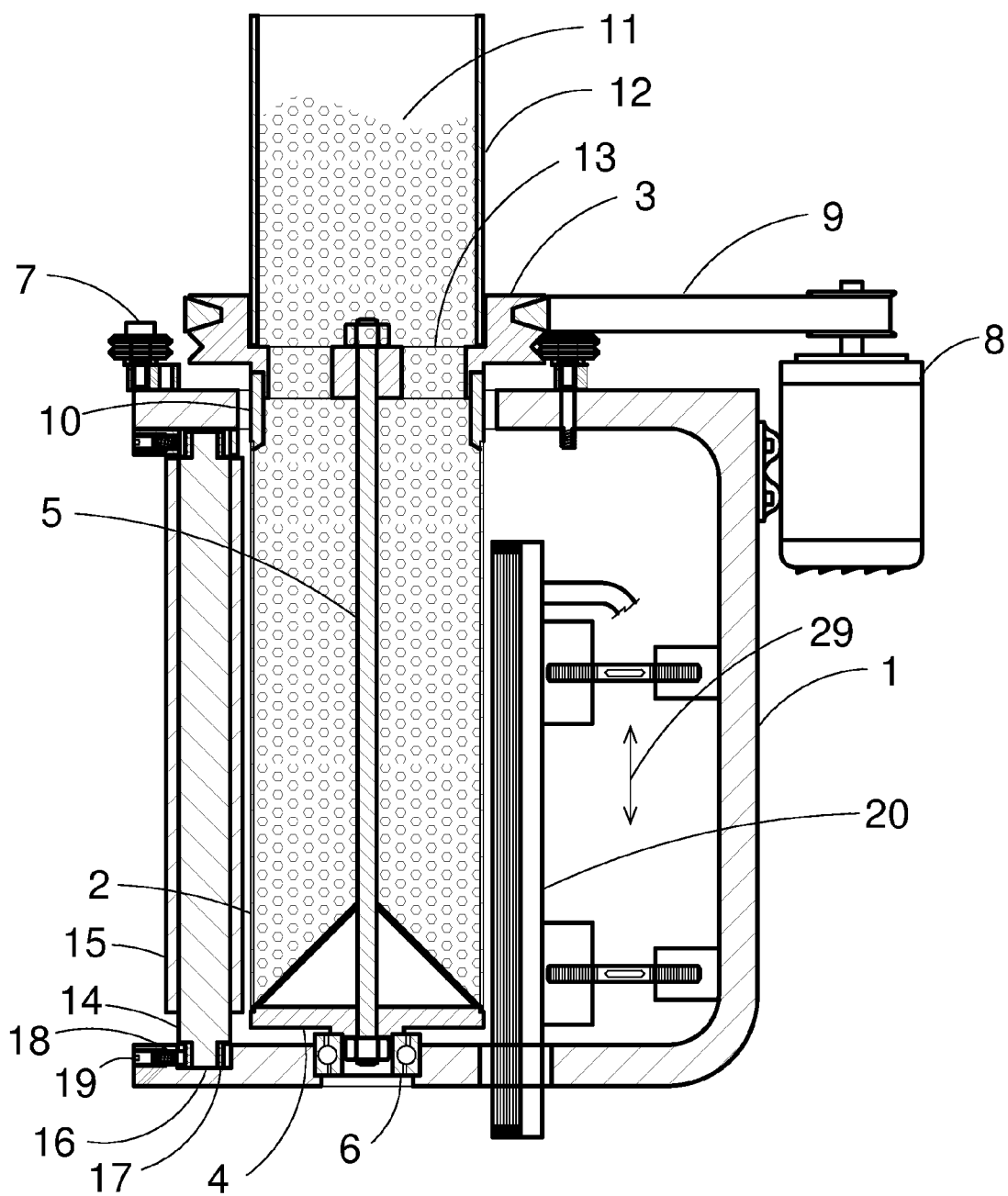
FIG. 2 is a partial cross section of a vertical apparatus with the inductor coil position adjusted in a first dimension.

The gap between coil 20 and cylinder susceptor 2 can be adjusted to moderate the induced heat at the cylinder ends by counter threaded pins 24. Inductor coil 20 is position adjusted in a second dimension to alter the coil end effect at the cylinder susceptor 2 ends as shown by arrows 28 moving assembly 23-25 in FIG. 4. Inductor coil 20 is position adjusted in a third dimension to limit melting to a variable portion of the length of cylinder susceptor 2 as shown by arrows 29 of FIG. 2. Spacing the ferrite "E" cores 22 can further profile the induced heat. These design methods are well known to those trained in the art of induction heating.

FIG. 3 shows that pressure roll 14 can be adjusted to position 14a for slow process speeds where more susceptor heat will be transferred to the substrate. Position 14b allows more thermal transfer time at temperature for faster process speeds.

Figure 4:
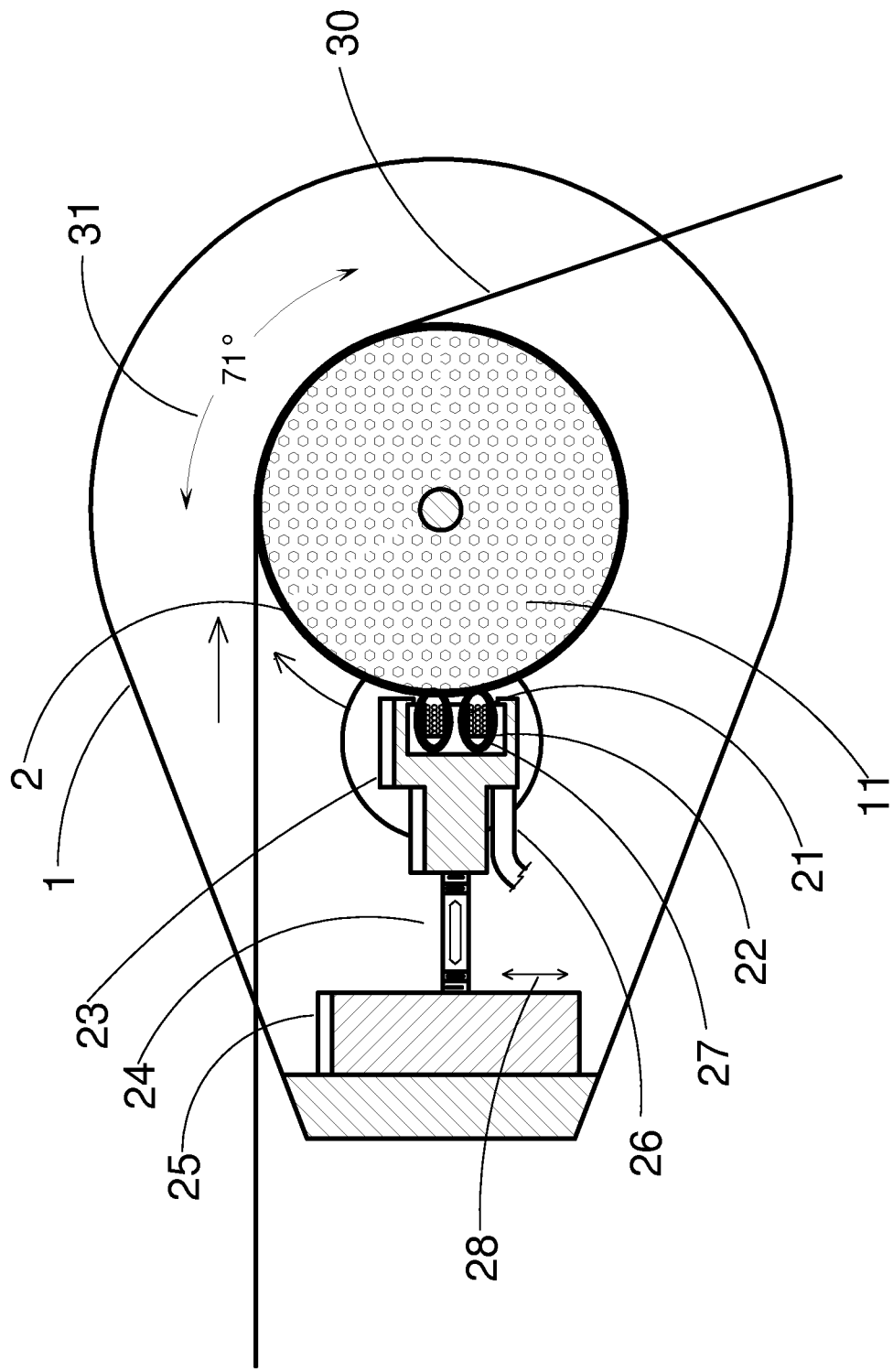
FIG. 4 is a top view in partial cross section of the FIG. 1 apparatus with the inductor coil position adjusted in a second dimension.

FIG. 4 illustrates a continuous thin substrate 30 being placed in contact with a speed dependent number of degrees 31 of the diameter of cylinder susceptor 2. A pattern of material matching the perforations in cylinder susceptor 2 can be placed on substrate 30 by matching cylinder susceptor 2 rotary surface speed to the substrate speed. When a fine staggered perforation pattern is placed in cylinder susceptor 2, a minor off set of the speeds will produce a full coating of variable thickness.

FIG. 5 illustrates a horizontal embodiment of the invention where pelletized material is introduced to cylinder susceptor 32 by vacuum feeder through tube 33. Material 11 gravity disperses in cylinder susceptor 32 and only needs to maintain a fill level covering the zone in contact with the substrate. Frame 34 holds cylinder susceptor 32 in rotary alignment through thermal isolating hubs 35 and roller bearings 36. Variable speed motor 37 provides rotation through sprockets 38a and 38b with chain 39 of FIG. 5a.

Inductor coil 40 is placed 90° from the application point on cylinder susceptor 32, rotating in the direction of arrow 41, to pass substrate material in direction of arrow 42. Pressure can be applied with frame 34 directly above roller 43 to laminate successive layers 44. With inductor coil 40 placed 180° from roller 43, additional layers of substrate material can be pressure placed in reverse transit.

Figure 6:
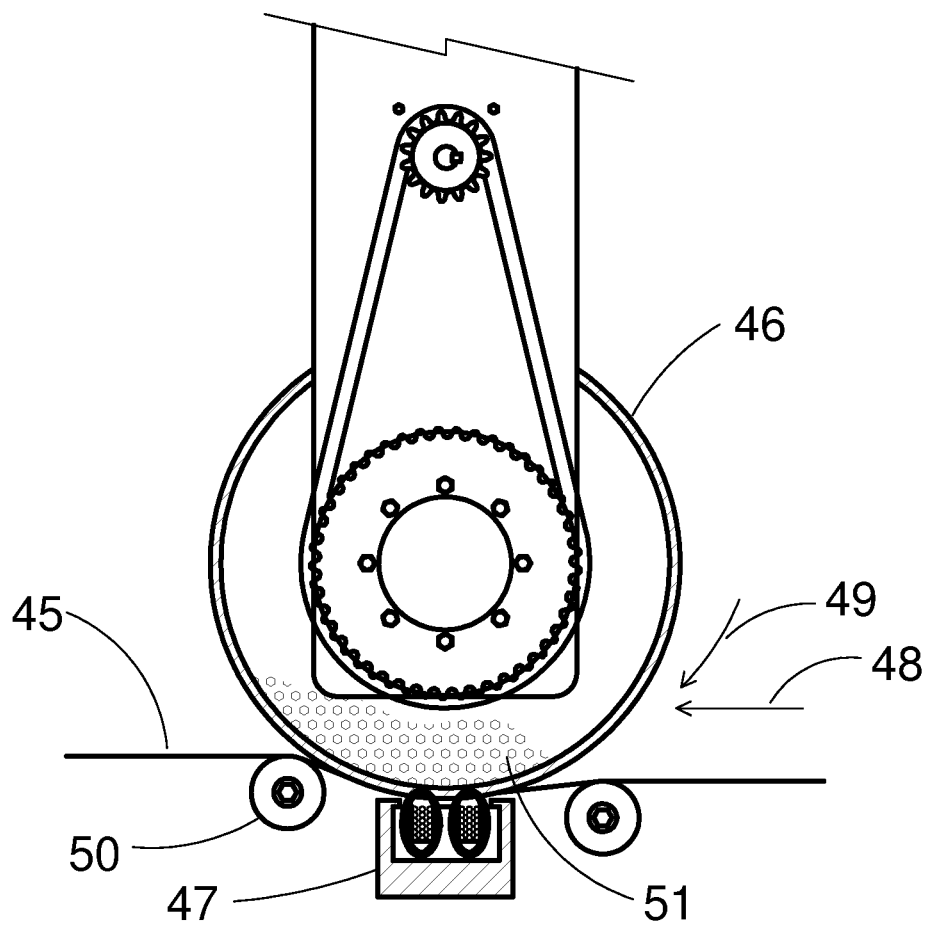
FIG. 6 is a partial cross section of an end view of a horizontal embodiment of the invention.

FIG. 6 illustrates a horizontal embodiment of the invention where thin pliable electrically non-conductive substrate 45 is passed through the gap between cylindrical susceptor 46 and inductor coil 47. The motion of substrate 45 moving in the direction of arrow 48 and the surface of cylindrical susceptor 46 moving in the direction of arrow 49 are coordinated. Roll 50 is positioned to control the time that substrate 45 is in contact with melted material 51.

Figure 7:
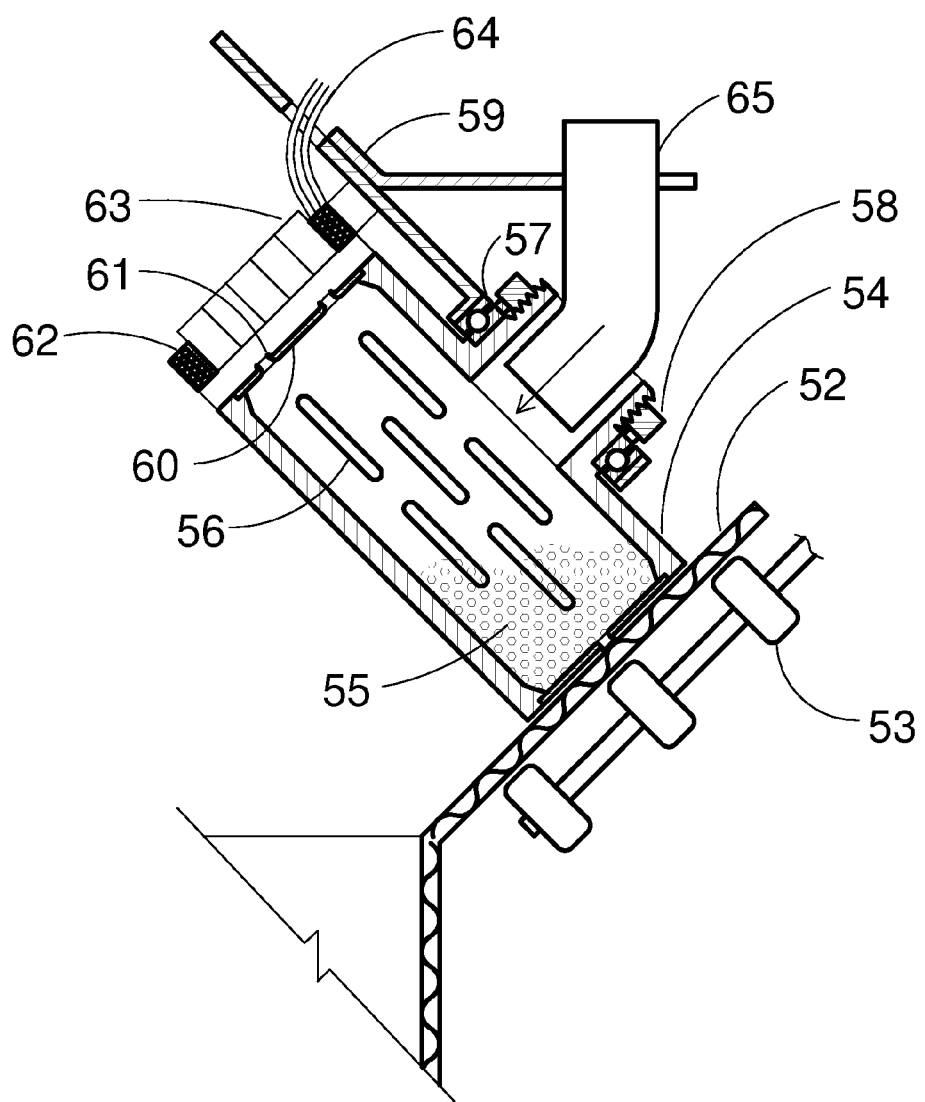
FIG. 7 is a partial cross section of the invention applied to carton erection and closing.

FIG. 7 is an illustration of a specific application of the invention to carton erection and closing. Carton flap 52 is passed between idle rolls 53 and rotary pattern application roll 54. Stripes of hot melt adhesive material 55 are applied in the pattern of slots 56. Application roll 54 is designed for interchange by insertion in bearing 57 and secured with thread nut 58 to accommodate different carton material and sizes. Frame 59 holds all components in position and adjusts to apply just enough pressure to the periphery of pattern roller 54 and carton flap 52 to impart rotary motion as it passes. The apparatus of FIG. 7 can be inverted to apply hot melt adhesive to the underside of carton flaps for an erection operation.

Slots 56 in cylindrical susceptor 60 are indented when punched, slightly raising the exterior edge of slot cross-section 61. After assembly of pattern roller 54 the slot edges are machined to place them in parallel alignment with the axis of rotation. The raised exterior edge of slot 56 defines an accurate deposited pattern of melted material.

Inductor coil 62 is wound with Litz wire, utilizes ferrite flux concentrators 63, and is placed over approximately 45° of the surface of cylinder susceptor 60. High frequency power leads 64 connect to a 1 KW-100 KZ power supply attached to frame 59.

I claim:

1. An apparatus for melting particulate material and applying a pattern of said melted particulate material, comprising:
    a pattern perforated rotary cylinder susceptor to receive said particulate material;
    a bar shaped inductor coil for inducing current in said rotary cylinder susceptor to melt said particulate material;
    a high frequency power supply to power said bar shaped inductor coil; and
    a frame that positions said bar shaped inductor coil and said rotary cylinder susceptor and applies pressure to impart rotation in said rotary cylinder susceptor in contact with a moving substrate.

2. The apparatus according to claim 1, having the substrate contact the cylinder susceptor at a variable radial distance from the inductor coil to control a time that the substrate is in contact with the melted particulate material.

3. The apparatus according to claim 1, having a continuous substrate presented to said rotating cylinder surface for a variable peripheral distance to control a time that the substrate is in contact with the melted particulate material.

4. The apparatus according to claim 1, having the frame pressure said rotating cylinder to semi-rigid substrate to assure full contact.

5. The apparatus according to claim 1, wherein a spring loaded pressure roll applies pressure to the moving substrate to assure full contact with the rotating cylinder susceptor.

6. The apparatus according to claim 1, wherein a variable speed motor rotates said rotary cylinder susceptor.

\* \* \* \* \*